United States Patent [19]

Sode

[11] 4,025,856
[45] May 24, 1977

[54] ANTENNA APPARATUS

[76] Inventor: Laurence A. Sode, 345 Fullerton Parkway, Chicago, Ill. 60614

[22] Filed: Feb. 23, 1976

[21] Appl. No.: 660,487

[52] U.S. Cl. .............................. 325/379; 325/365; 325/383; 343/788; 343/702; 179/82

[51] Int. Cl.² .................................. H01Q 7/08

[58] Field of Search .......... 325/360, 365, 366, 367, 325/368, 369, 370, 371, 383, 379; 343/742, 788, 867, 713; 179/82

[56] References Cited

UNITED STATES PATENTS

| | | | |
|---|---|---|---|
| 1,538,466 | 5/1925 | Cohen et al. ...................... | 325/383 |
| 2,066,690 | 1/1937 | Keller ................................ | 325/379 |
| 2,624,004 | 12/1952 | Polydoroff ........................ | 343/867 |
| 3,440,542 | 4/1969 | Gautney ............................ | 343/788 |
| 3,721,989 | 3/1973 | Christensen ...................... | 343/788 |

FOREIGN PATENTS OR APPLICATIONS

| | | | |
|---|---|---|---|
| 271,911 | 2/1928 | United Kingdom ............... | 325/379 |
| 519,755 | 4/1940 | United Kingdom ............... | 325/379 |

*Primary Examiner*—Robert L. Griffin
*Assistant Examiner*—Tommy P. Chin
*Attorney, Agent, or Firm*—Merriam, Marshall, Shapiro & Klose

[57] ABSTRACT

An omnidirectional antenna apparatus for processing received FM stereophonic radio signals to substantially eliminate multipath distortion in the stereophonic sound reproduced by a radio receiver coupled thereto.

10 Claims, 6 Drawing Figures

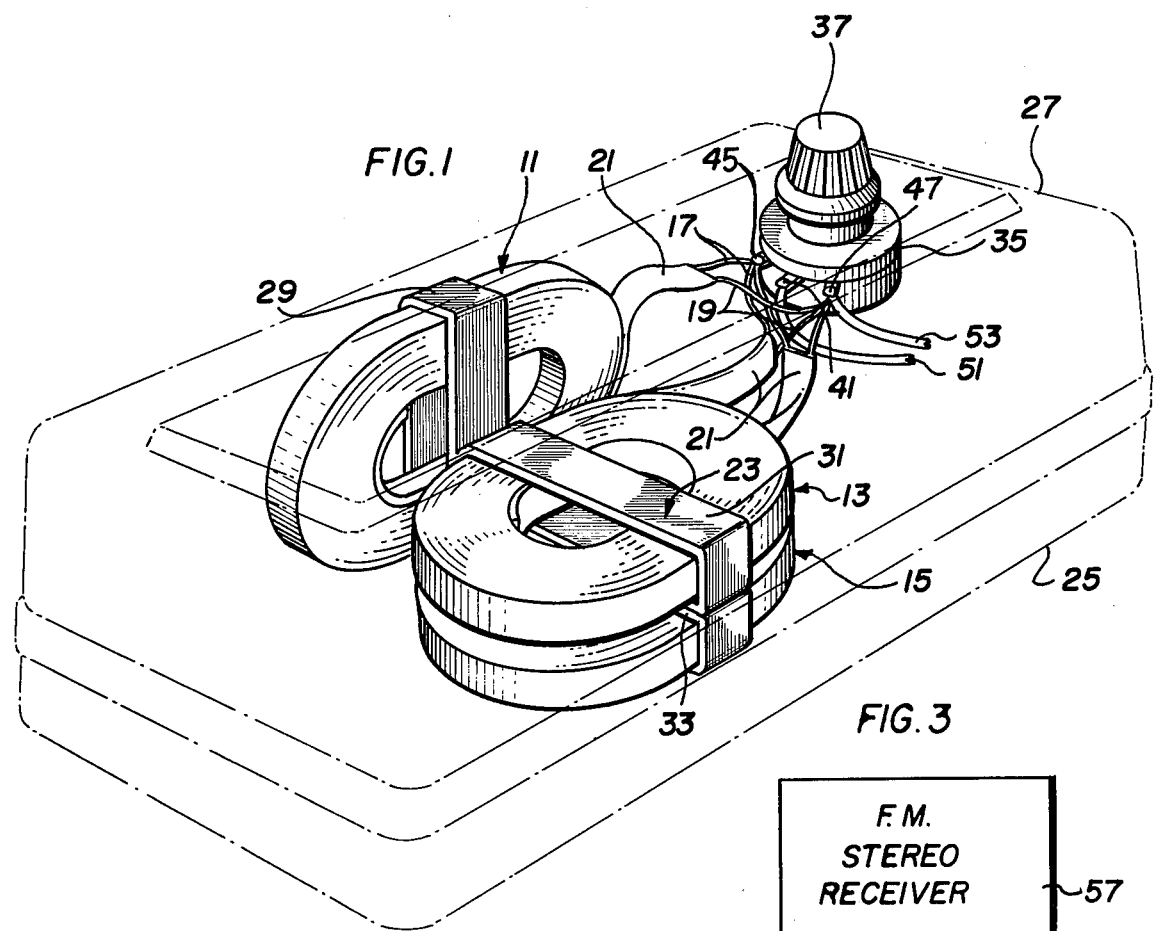
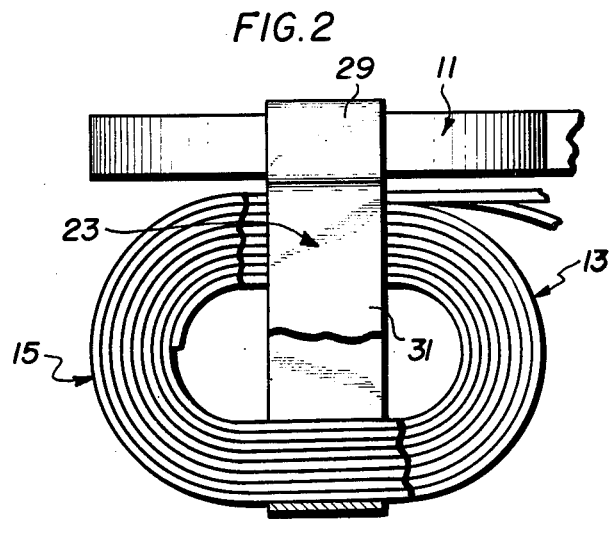
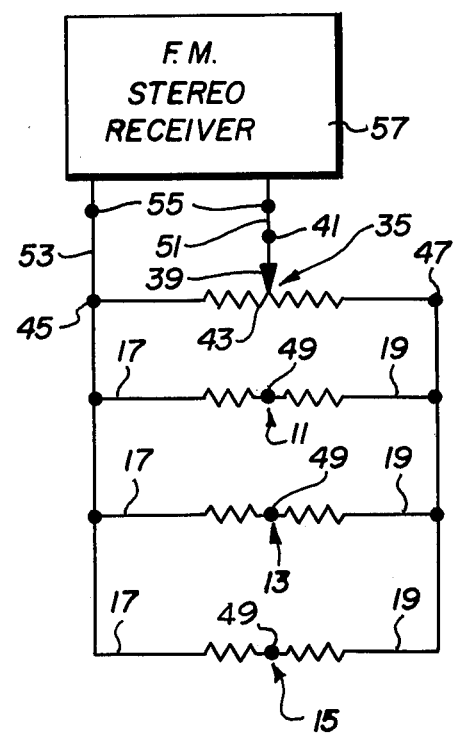

ANTENNA APPARATUS

The present invention relates generally to antennas and more particularly to omnidirectional, indoor antennas for substantially eliminating audible multipath distortion in the stereophonic sound reproduced from received radio signals in the FM frequency range.

Objectionable distortion of the type commonly knonw as multipath distortion often occurs when stereophonic programming is reproduced by a radio receiver from received frequency-modulated (FM) radio signals. such FM radio signals are radiated line-of-sight and at relatively low altitudes from a broadcast antenna, and accordingly, multipath distortion generally results when some of the FM radio signals which would normally be intercepted by the antenna of the radio receiver encounter an obstacle, such as a tall building, and are reflected to the radio receiver to conflict with the primary signal whch travels unimpeded from the transmitter antenna to the receiver antenna. Although in most geographical areas multipath distortion is not a serious problem because the secondary signals are substantially dissipated before they reach the receiver, in and near urban areas, where there are an abundance of reflective structures, such as tall buildings, power line towers, and the like, it can be a very severe problem.

Since the reflected, or secondary, signals follow a more circuitous path to the receiver than the primary signal, the seconday signal is attenuated and time delayed with respect to the corresponding primary signals, arriving at the radio receiver antenna after the primary signal, thereby resulting in at least two undesirable phenomena. First, the primary signal and the one or more secondary signals intercepted by the radio receiver antenna combine to cancel and enhance each other during processing by the radio receiver. This cancellation and enhancement is manifested as fluctuations in the volume emanating from the speakers associated with the receiver thereby creating a so-called wandering minstrel effect. Secondly, there is a phase shift in the composite signal which is manifested as a middle or upper frequency hissing noise in the background of the sound reproduced by the receiver. Accordingly, multipath distortion is associated primarily with stereophonic and quardraphonic sound reproduction due to the dependence of both systems on the maintenance of very complex phase relationship between the components comprising the primary signal.

In accordance with the present invention, the omnidirectional antenna apparatus hereinafter disclosed is effective to process received FM stereophonic radio signals to substantially eliminate multipath distortion in the stereophonic sound reproduced by an FM radio receiver coupled thereto.

More particularly, the antenna apparatus of the present invention comprises means, including first, second and third air-wound coils, for intercepting the radio signals. Each of the coils comprises a pair of parallel electrical conductors which are interconnected at one end to provide a combined loop and doublet. The first coil and the second coil are aligned in parallel spaced-apart planes, and the third coil is disposed adjacent to the edges of the first coil and the second coil in a plane substantially normal to the planes of the first coil and the second coil. A voltage divider means, such as a potentiometer or the like, is coupled to the other ends of each of the pairs of conductors so as to be coupled in parallel with each of the first, second, and third coils. The coils and the voltage divider means combine to convert the received signals to electrical signals comprising corresponding primary and secondary components having respective amplitudes corresponding to the relative signal strengths of the primary and secondary signals comprising the received radio signals. Accordingly the voltage divider means is adjustable to reduce the amplitude of the secondary component to below a predetermined amplification threshold level of the radio receiver so that the secondary components are not reproduced while the stronger primary component, although also proportionately reduced, exceeds the predetermined threshold level and is reproduced by the radio receiver.

In a constructed embodiment of the present invention wherein each coil comprises a length of twin lead antenna wire about six feet long, it was determined that the apparatus was effective to substantially eliminate multipath distortion when used within a range of nine miles from a transmitter antenna radiating at least 1500 watts of power.

A second embodiment is also provided which, in accordance with the principles of the present invention, includes means comprising four such coils, each about four feet in length. Each of the coils is coupled in parallel with the voltage divider means as hereinbefore described in connection with the first embodiment, but a switch means is interposed between the first and second coils and the third and fourth coils to selectively couple the third and fourth coils to the first and second coils and the voltage divider means. Accordingly, when the antenna apparatus is about 8 miles to 15 miles from the aformentioned transmitter antenna radiating at least 1500 watts of power, the apparatus is effective to substantially eliminate multipath distortion when the third and fourth coils are disconnected. When all four coils are utilized, the range of the antenna apparatus has been found to be from about 15 miles to thirty miles.

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 1 is a perspective view of antenna apparatus in accordance with one embodiment of the present invention;

FIG. 2 is a partial top elevational view of the antenna apparatus shown in FIG. 1 broken away to illustrate the positioning of the coils;

FIG. 3 is a schematic representation of the antenna apparatus shown in FIG. 1;

Figure 4:
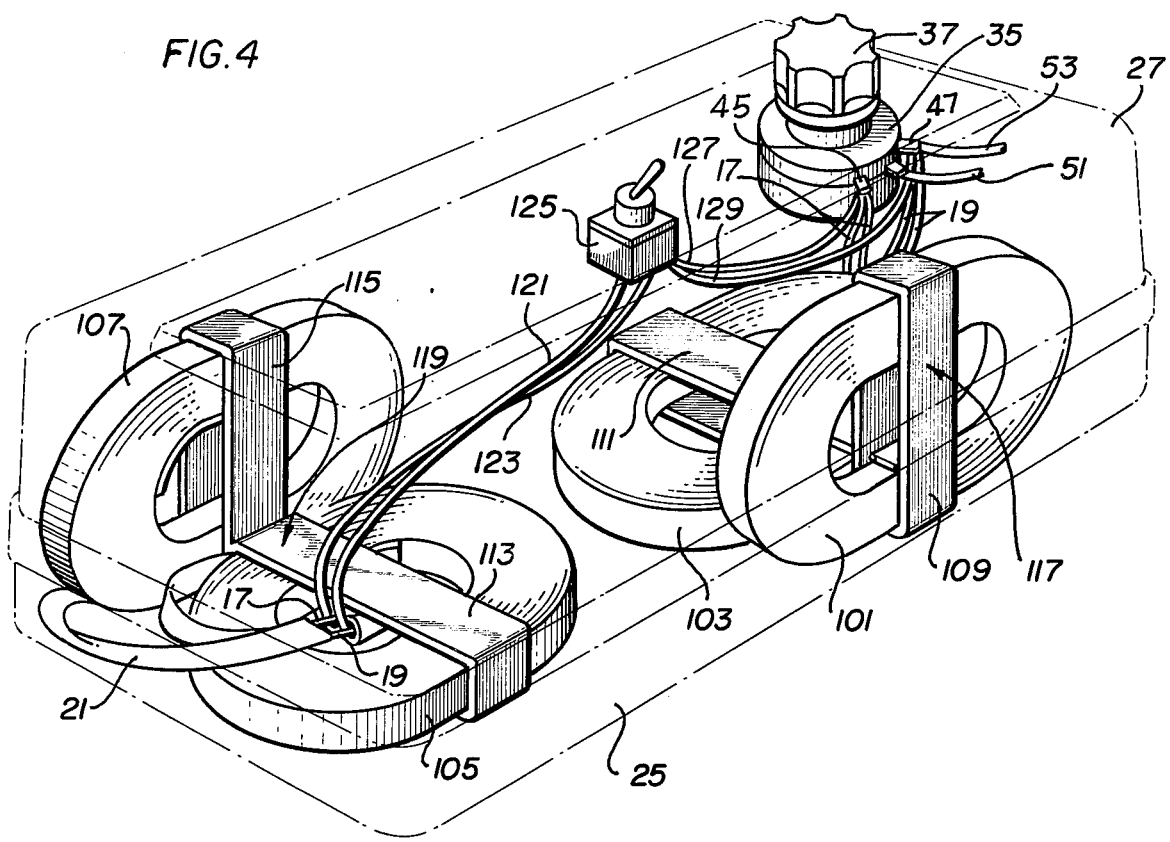
FIG. 4 is a perspective view of antenna apparatus in accordance with a second embodiment of the present invention.

With reference now to FIGS. 1—3, the antenna apparatus shown therein has been found to be omnidirectional and effective to substantially eliminate the deleterious effects of multipath distortion in the sound reproduction of FM stereophonic broadcast radio signals received from transmitter antennas wihin about nine miles of the receiver.

The particular antenna apparatus shown in FIG. 1 illustrates an embodiment of the present invention having three air-wound coils, 11, 13, and 15, each comprising a length of twin lead antenna wire of the type commonly used to couple television signals from an antenna to a television receiver. More particularly, such twin lead antenna wire comprises a pair of parallel electrical conductors, 17 and 19, contained within and held by a flexible, flat, web-like, insulating member 21 at a predetermined distance from one another. Thus, each of the coils, 11, 13, and 15, comprises a pair of parallel, spaced-apart conductors, 17 and 19, wound about and at a distance from a corresponding imaginary center axis that is substantially normal to the parallel planes in which the conductors, 17 and 19, lie. In the aformentioned embodiment constructed in accordance with the principles of the present inventon, 300-ohm twin lead antenna wire was used.

The coils 11, 13, and 15, are mounted in fixed relationship with one another in a holder 23 glued or otherwise affixed to the bottom of a lower case portion 25, which, together with a fitted upper case portion or cover 27, comprises a compact case for containing the antenna apparatus. In the present embodiment, the holder 23 is a plastic device comprising two integral open-ended rectangular sleeve members, 29 and 31, for holding the three coils, 11, 13, and 15, in fixed relationship to one another. Alternatively, the sleeves, 29 and 31, can be separate and distinct devices mounted within the case. In the present embodiment, the first sleeve 29 is positioned so that the coil 11 held thereby lies in a substantially vertical plane while the other two coils, 13 and 15, are held by and in the second sleeve 1 in substantially horizontal positions immediately adjacent and normal to the plane of the first coil 11. The two horizontally disposed coils, 13 and 15, are maintained within the sleeve 31 in a spaced-apart manner, parallel to and vertically coincident with one another. It has been experimentally determined that the opposint surfaces of the coils, 13 and 15, should be positioned at least one inch from each other or the antenna apparatus becomes directional. Accordingly, the desired spacing should be maintained by any of a number of means such as, for example, a spacer element 33 integrally molded to the sleeve 31, or alternatively, the sleeve 31 may comprise two separate spaced-apart sleeves for holding the coils, 13 and 15, respectively.

As shown in FIG. 1 and illustrated schematically in FIG. 3, the coils, 11, 13, and 15, are coupled to a potentiometer 35 which is secured on the underside of the cover 27 with its control shaft extending therethrough. A knob 37 is mounted on the shaft to rotate the shaft and thereby adjust a movable contact or wiper arm 39, coupled to an output terminal 41, along a fixed resistive impedance element 43, which, in the aformentioned constructed embodiment, had a resistance of 300 ohms. In particular, one end of each conductor 17 is connected to a terminal 45 associated with and coupled to one end of the fixed impedance element 43 while the corresponding end of each conductor 19 is connected to a terminal 47 coupled to the other end of the impedance element 43. In addition, each pair of conductors, 17 and 19, are interconnected at their respective other ends, as indicated at 49 in FIG. 3, so that each of the coils 11, 13, and 15, is, in effect, a combined loop and doublet providing a continuous electrical path in parallel with the impedance element 43 and each other coil.

A pair of insulated electrical conductors, 51 and 53, coupled to the output terminals, 41 and 45, respectively, of the antenna apparatus, are provided and, in operation, are coupled to the antenna inputs 55 of a FM stereophonic radio receiver 57 which typically includes input circuits for amplifying input electrical signals having amplitudes at or above a predetermined threshold level. More particularly, the constructed embodiment of the antenna apparatus is intended to be coupled to the 300 -ohm balanced antenna inputs of the receiver. Optimally, the conductors, 51 and 53, should be a two-conductor rotor wire less than 5 feet long to minimize insertion loss, although common a-c line cord can be used with less favorable results.

Operationally, the coils, 11, 13, and 15, intercept the broadcast FM radio signals and cooperate with the fixed impedance element 43 of the potentiometer 35 to develop an electrical signal, or voltage, across the impedance element 43 which is representative of and induced by the received radio signals. The electrical signal developed across the fixed impedance element 43 at any patricular times comprises components representative of the primary signal and one or more secondary signals intercepted by the antenna apparatus. As previously stated, however, the secondary signals are attenuated with respect to the primary signal, and therefore, the signal strengths of the components representative of the secondary signals are somewhat lower than the signal strength of the component attributable to the primary signal.

Accordingly, multipath distortion can be substantially eliminated in the sound reproduced by the FM stero-phonic radio receiver 57 by adjusting the movable contact 39 of the potentiomerter 35 along the fixed impedance element 43 so that only a portion of the induced electrical signal, or voltage, developed across the output terminals, 41 and 45, is coupled to the antenna inputs 55 of the radio receiver 57. Thus, the amplitudes of the secondary signal components will be correspondingly reduced to levels below the amplification threshold of the input amplifier circuits of the radio receiver 57 and, therefore, will not be reproduced by the receiver 57. Since the amplitude of the primary component of the electrical signal applied to the radio receiver 57, even though reduced, is substantially larger than the amplitudes of the secondary components, the level of the primary component is still sufficient to drive the input circuits of the radio receiver 57 to reproduce the received stereophonic radio programming. Accordingly, the antenna apparatus of the present embodiment is effective to substantially eliminate multipath distortion from the sound reproduced by the FM sterophonic radio receiver 57.

In the embodiment of the antenna apparatus theretofore constructed as shown in FIGS. 1–3, it was determined experimentally that the optimum length of each coil of twin lead antenna wire is about 6 feet. During such experimentation, it was found that coils more than 6 ½feet in length provide input signals having secondary components too high to be reduced below the threshold level of the receiver input circuits, resulting in multipath distortion. Coils less than 5½feet in length, on the other hand, were found to reduce the capture ratio of the antenna apparatus to a point where the differential between the primary and secondary components is so small that, although the secondary signals can be reduced to below the threshold, the remaining primary component is not sufficient to provide good stereophonic sound reproduction. In addition, it was found that the radius of the coils has no substantial effect on performance, and therefore, it may be desirable, in a constructed embodiment, to utilize coils having a small radius so that a compact unit can be provided for indoor use.

Finally, as previously stated, it has been found that the constructed embodiment of the present invention is an effective omnidirectional antenna apparatus for reducing multipath distortion in reproduced stereophonic sound when used within a range of nine miles from an FM transmitter antenna radiating at least 1500 watts of power.

Figure 5:
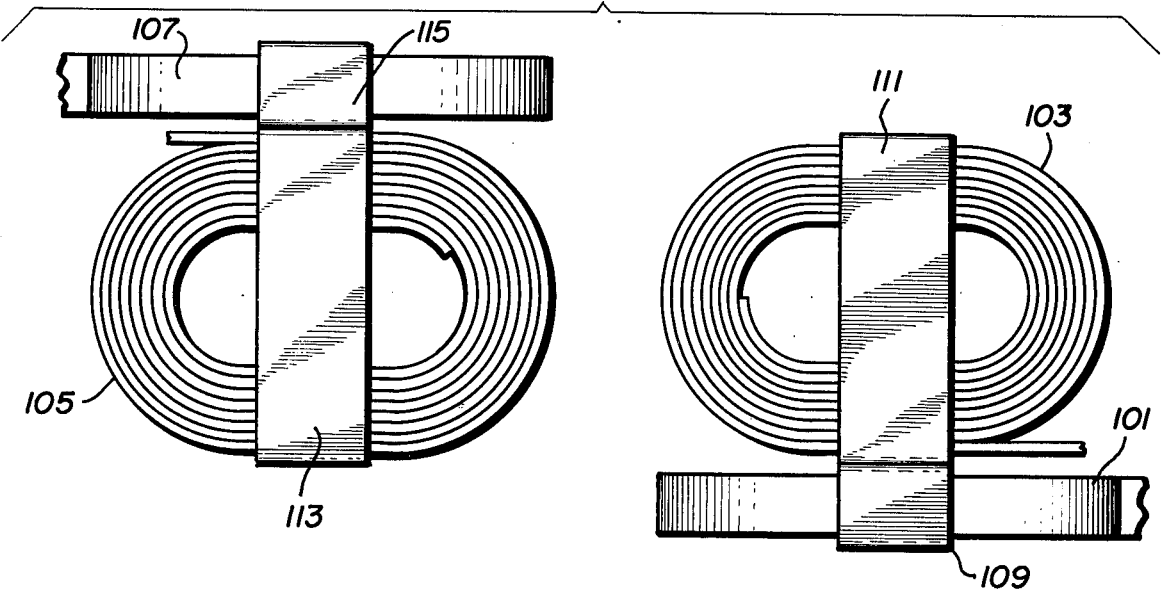
FIG. 5 is a partial elevational view of the antenna apparatus shown in FIG. 4 illustrating the positioning of the coils.
Figure 6:
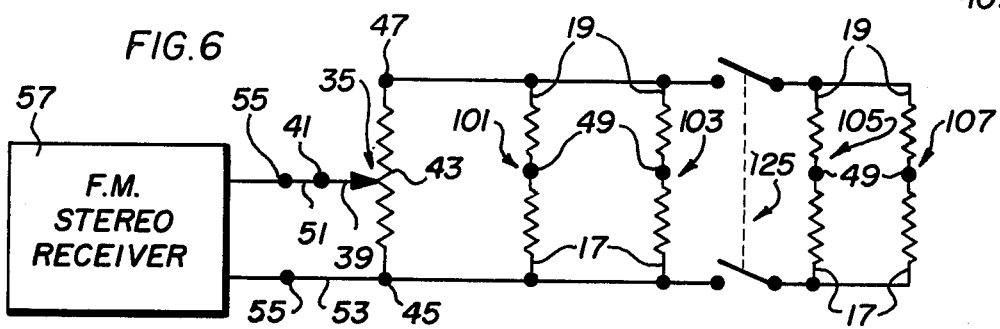
FIG. 6 is a schematic representation of the antenna apparatus shown in FIG. 4.

While the apparatus shown in FIGS. 1–3 can be used at points farther than nine miles from the transmitter antenna with an appreciable degree of success, a second embodiment, shown in FIGS. 4–6, utilizes the same principles as the previously described embodiment and has been found to provide better performance in reducing or substantially eliminating multipath distortion at points from 8 miles to 30 miles from the transmitter antenna. Accordingly, the apparatus of the second embodiment has been found to particularly satisfy the needs of the suburban listener, who, in addition to listening to distant FM stations transmitting from the inner urban area, also listens to closer suburban stations.

The second embodiment illustrated in FIGS. 4–6 is similar in many respects to the first embodiment, and accordingly, only the essential differences between the two embodiments are hereinafter described. More particularly, in the second embodiment, four coils, 101, 103, 105, and 107, are mounted in the case in corresponding ones of four open-ended rectangular sleeves, 109, 111, 113, and 115. In an embodiment theretofore constructed, it was found that the optimum length of each coil is about 4 feet.

The sleeves, 109 and 111, comprise a single integral holder 117 and are aligned so that coil 101 is maintained in a substantially vertical plane while coil 103 is in a substantially horizontal plane normal to and immediately adjacent coil 101. Similarly, the other sleeves, 113 and 115, comprise a second such holder 119 which is positioned, as shown in FIGS. 4 and 5, so that coil 105 lies in a horizontal plane coincident with the horizontal plane of coil 103 and at some distance therefrom while coil 107 is held in a substantially vertical position immediately adjacent to coil 105 but on the opposite side of coil 105 with respect to coil 101.

As in the embodiment previously described, each pair of the conductors, 17 and 19, corresponding to a particular one of the coils are interconnected at one end, as indicated by 49 in FIG. 6. The other ends of each pair of conductors, 17 and 19, comprising each of coils 101 and 103 are connected directly to the terminals, 45 and 47, respectively, of the potentiometer 35. The unshorted ends of the conductors, 17 and 19, comprising coils 105 and 107, however, are coupled by a pair of insulated electrical conductors, 121 and 123, directly to a double-pole, double-throw switch 125 which, in turn, is coupled to the potentiometer 35 by a second pair of conductors, 127 and 129. The switch 125 selectively couples coils 105 and 107 to the potentiometer end terminals 45 and 47 and, thus, in parallel with coils 101 and 103. Accordingly, as schematically illustrated in FIG. 6, when the switch 125 is open, only coils 101 and 103 are connected in parallel with the fixed impedance element 43 of the potentiometer 35. When, on the other hand, the switch 125 is closed, coils 105 and 107 are also connected in parallel with potentiometer 35 and the other coils, 101 and 103.

With the double-pole, double-throw switch 125 in the open position and coils 105 and 107 disconnected, it has been found that the antenna apparatus of the present embodiment is still effective to substantially eliminate multipath distortion when radio signals are received from stations radiating at least 1500 watts of power at distances of about 8 miles to 15 miles from the receiver whereas when all four coils are utilized the range is from about 15 miles to 30 miles. It has been found, however, that although the two coil arrangement gives good results with respect to eliminating or substantially reducing multipath distortion, it is slightly directional.

Finally, it should be understood that the potentiometer can be replaced by a tuning slug or other similar voltage divider device without adversely affecting the performance of the antenna apparatus. Although in the constructed embodiments hereinbefore described a potentiometer was utilized, a tuning slug can be substituted for the potentiometer because of the small current carrying capacity required by the apparatus.

While particular embodiments of the present invention have been shown as described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. An antenna apparatus for processing received FM stereophonic radio signals comprising primary and secondary radio signals and for coupling said processed signals to a radio receiver having means for reproducing stereophonic sound from applied processed signals having amplitudes at or above a predetermined threshold level, said antenna apparatus comprising
    means including first, second and third coils for intercepting said radio signals, each of said coils comprising a pair of parallel electrical conductors interconnected at one end;
    means for holding said first coil and said second coil aligned in parallel spaced-apart planes and said third coil disposed adjacent the edges of said first coil and said second coil in a plane substantially normal to the planes of said first coil and said second coil; and
    voltage divider means coupled to the other ends of each of said pairs of conductors so as to be coupled in parallel with each of said first, second, and third coils, said coils and said voltage divider means combining to convert said radio signals to electrical signals comprising corresponding primary and secondary components having respective amplitudes corresponding to the relative signal strengths of said primary and secondary radio signals,
    said voltage divider means being adjustable to selectively reduce the amplitude of said electrical signals until said secondary components are below the predetermined threshold level of said radio receiver and said primary component exceeds said predetermined threshold level.

2. Apparatus in accordance with claim 1 wherein said voltage divider means comprises a fixed impedance element coupled across the ends of said coils and a movable contact for deriving a proportional representation of the electrical signals developed across said fixed impedance element responsive to said coils intercepting said radio signals and wherein said radio receiver is coupled to one end of said fixed impedance element and said movable contact.

3. Apparatus in accordance with claim 2 wherein said voltage divider means comprises a potentiometer.

4. Apparatus in accordance with claim 1 wherein said holding means includes means for holding said first and second coils so that the opposing surfaces fof said first and second coils are at least one inch apart.

5. Apparatus in accordance with claim 1 wherein each of said coils comprise a length of twin lead antenna wire about six feet long.

6. An antenna apparatus for processing received FM stereophonic radio signals comprising primary and secondary radio signals for coupling said processed signals to a radio receiver having means for reproducing stereophonic sound from applied processed signals having amplitudes at or above a predetermined threshold lever, said antenna apparatus comprising:

means including first, second, third and fourth coils for intercepting said radio signals, each of said coils comprising a pair of parallel electrical conductors interconnected at one end, means for holding said first and third coils in a common plane and said second and fourth coils disposed in respective planes normal to the plane of said first and third coils, said second coil being adjacent to said first coil and said fourth coil being adjacent said third coil on the opposite side of said third coil with respect to said second coil;

voltage divider means coupled to the other ends of each of said pairs of conductors of said first and second coils so as to be coupled in parallel with each of said first and second coils; and switch means for selectively coupling each of said third and fourth coils in parallel with said first and second coils and said voltage divider means;

said coils and said voltage divider means combining to convert said radio signals to electrical signals comprising corresponding primary and secondary components having respective amplitudes corresponding to the relative signal strengths of said primary and secondary radio signals, said voltage divider means being adjustable to selectively reduce the amplitude of said electrical signals until said secondary components are below the predetermined threshold level of said radio receiver and said primary component exceeds said predetermined threshold level.

7. Apparatus in accordance with claim 6 wherein said voltage divider means comprises a fixed impedance element coupled across the ends of said coils and a movable contact for deriving a proportional representation of the electrical signals developed across said fixed impedance element responsive to said coils intercepting said radio signals and wherein said radio receiver is coupled to one end of said fixed impedance element and said movable contact.

8. Apparatus in accordance with claim 7 wherein said voltage divider means comprises a potentiometer.

9. Apparatus in accordance with claim 6 wherein said switch means comprises a double-pole, double-throw switch.

10. Apparatus in accordance with claim 6 wherein each of said coils comprise a length of twin lead antenna wire about four feet long.

* * * * *